Jan. 19, 1971 G. M. BROWN 3,555,628
RELEASE MECHANISM
Filed April 18, 1969 3 Sheets-Sheet 1
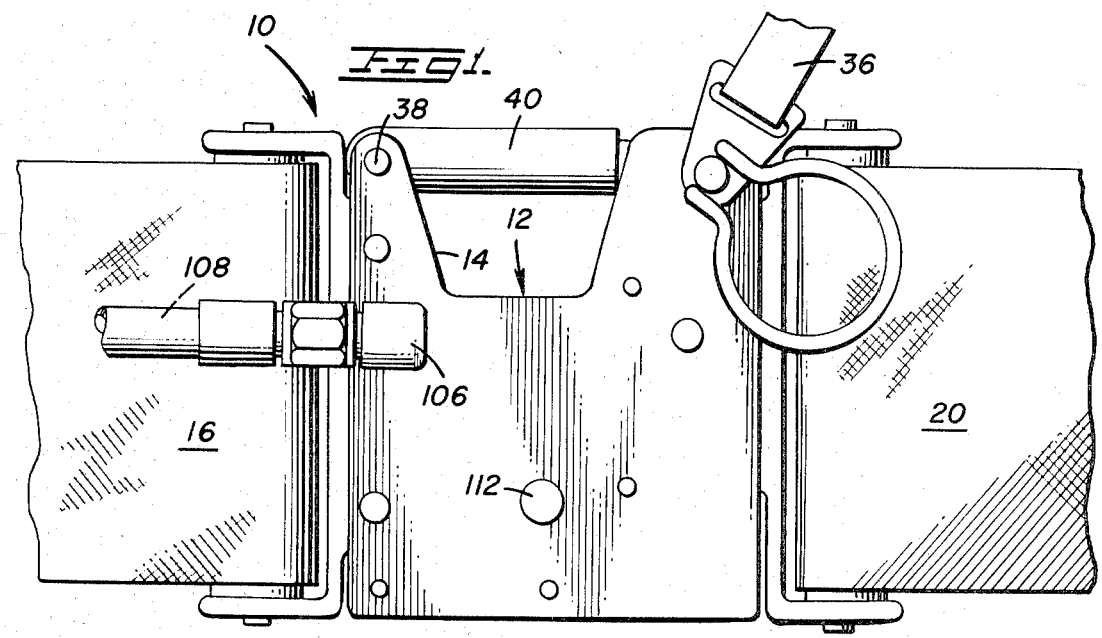
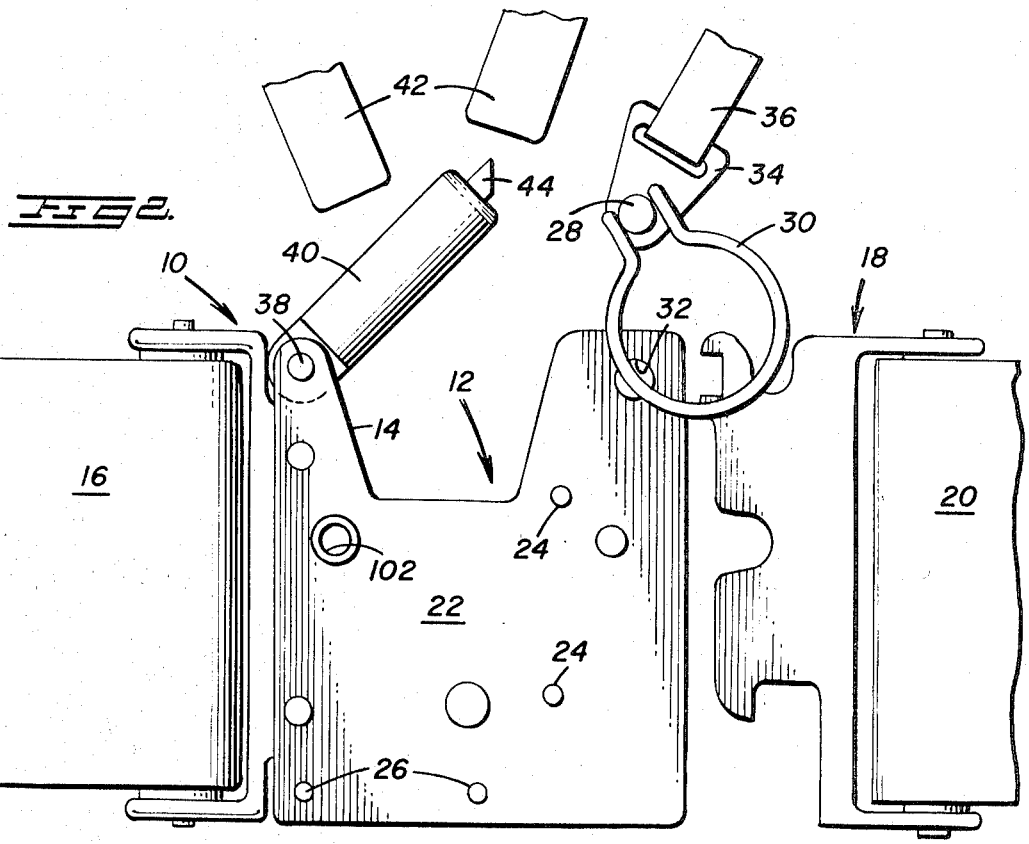
INVENTOR
GEORGE M. BROWN
BY Fidelman, Wolffe & Leitner
ATTORNEYS

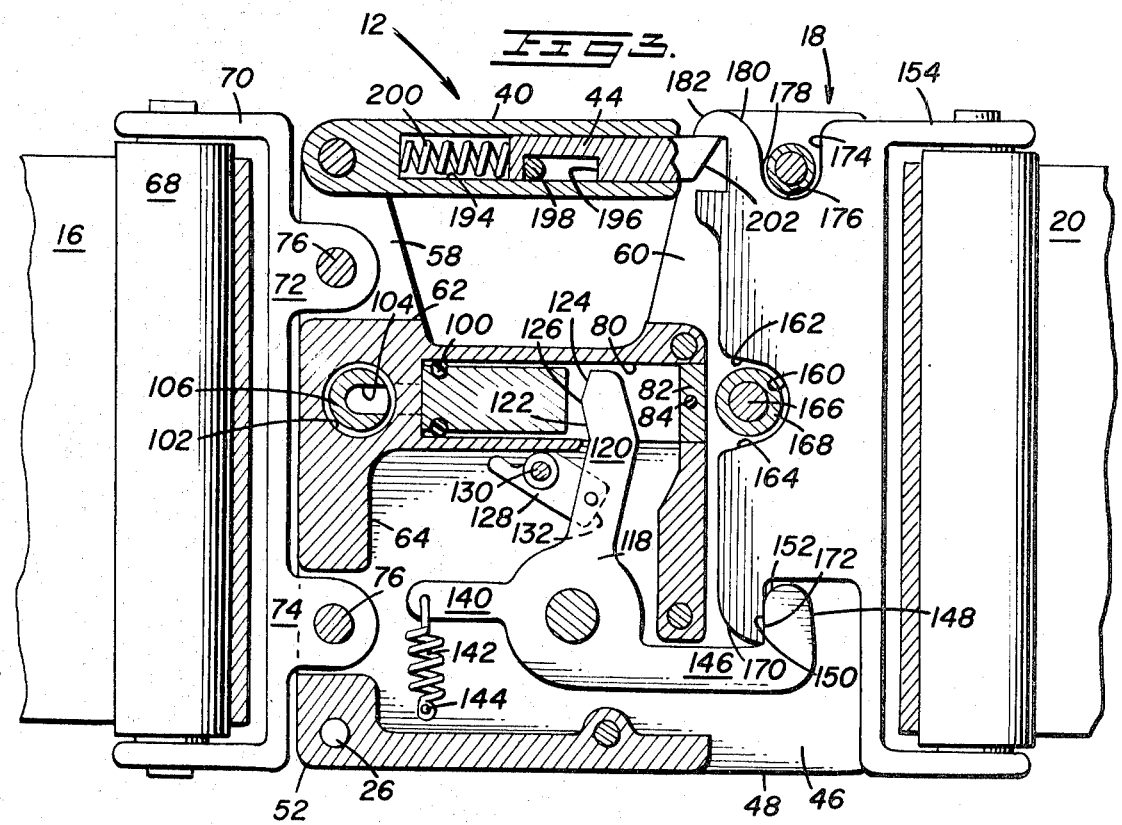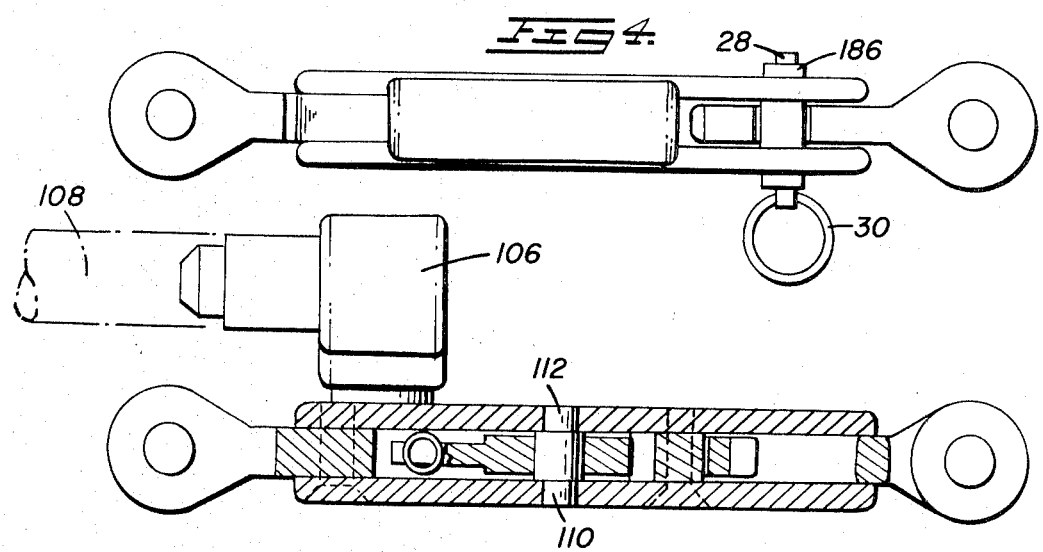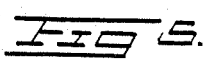

Jan. 19, 1971  G. M. BROWN  3,555,628
RELEASE MECHANISM
Filed April 18, 1969  3 Sheets-Sheet 3
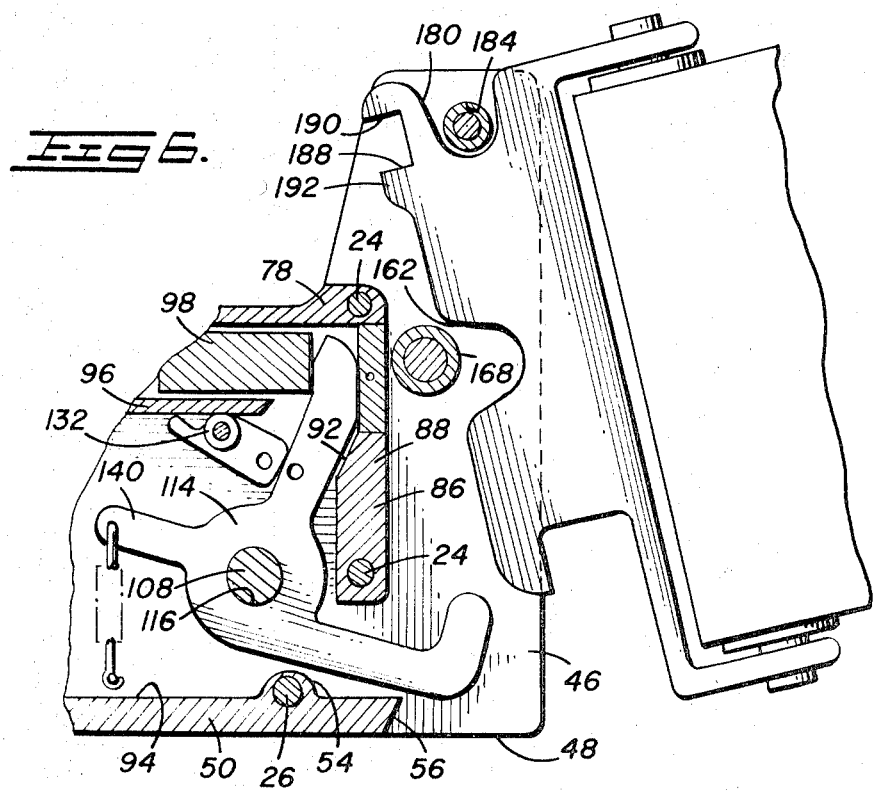
INVENTOR
GEORGE M. BROWN
BY
Fidelman, Wolffe & Leitner
ATTORNEYS United States Patent Office 3,555,628
Patented Jan. 19, 1971

3,555,628
RELEASE MECHANISM
George M. Brown, St. Petersburg, Fla., assignor to Sauna International, Inc., Miami, Fla., a corporation of Florida
Filed Apr. 18, 1969, Ser. No. 817,321
Int. Cl. A44b 11/25, 17/00
U.S. Cl. 24—205.17        7 Claims

ABSTRACT OF THE DISCLOSURE

A release mechanism for positively manually securing an aircraft pilot's shoulder harness, lap belt and canopy lanyard to aircraft ejection apparatus. The invention allows separation of the pilot from the ejection apparatus and deployment of the canopy subsequent to ejection. Alternatively, the invention is specifically designed to permit manual separation of the pilot and canopy from the ejection apparatus. The invention utilizes a single rotatable hub which may be inertially balanced. One leg extending from the hub is adapted for retaining a lap belt securely in position. Another leg is adapted for positive pivotal motion by the automatic ejection apparatus in order to release the lap belt subsequent to an ejection operation. The dog is thereby rotated to disengage the lap belt. The shoulder harness is secured to a spring loaded plunger which engages on the lug, release of the shoulder harness occurring simultaneously upon release of the lap belt lug. The canopy lanyard is secured to the release mechanism by a manually insertable locking pin. In operation the pin cooperates with the dog for retaining the lap belt lug until release thereof. For manual operation, removal of the lanyard pin enables manual release of the lap belt lug from the dog, such release further disengaging the spring loaded plunger whereby the shoulder straps are released.

The present invention relates to a release mechanism, and more particularly, to a release mechanism actuated by either manual or automatic operation.

The present invention has particular application to aircraft ejection and parachute release apparatus. A requirement of such ejection apparatus is that mechanism be provided for automatically separating the pilot therefrom subsequent to ejection from an aircraft. Additionally, the mechanism must automatically open the parachute. Further, such ejection apparatus must be specifically designed to permit manual separation of the pilot and his parachute from the ejection apparatus after completion of an aircraft flight wherein ejection was not performed.

The present invention relates to a release mechanism especially adapted for manually positively securing a pilot's shoulder hardness, lap belt and parachute lanyard to aircraft ejection apparatus. In addition to satisfying all the above described requirements, the present invention further obviates a need for cables or other relatively dangerous objects which would tend to injure a pilot upon his separation from the ejection apparatus. Further, the invention utilizes a single rotating part, which may be inertially balanced against vibrational motion, and which performs all the required release functions without the need for a multiple number of release mechanisms. Further, the release mechanism is incorporated in a single housing which meets stringent space limitation requirements without creating discomfort to a pilot.

Accordingly, it is an object of the invention to provide a release mechanism adapted for actuation by either manual or automatic operation.

Another object of the invention is to provide a release mechanism utilizing a single moving part which may be inertially balanced against undesired vibration motion and which performs a multiple number of releasable locking functions.

A further object of the invention is to provide a release mechanism which performs a multiple number of releasable locking functions obviating the need for multiple release mechanisms.

Still a further object of the invention is to provide a release mechanism especially suited for manually securing a pilot's shoulder hardness, lap belt and parachute lanyard to aircraft ejection apparatus without the need for cables or other objects which would tend to injure a pilot as he becomes separated from the ejection apparatus.

Yet another object of the invention is to provide a rotatable hub for releasably locking a lug to a release mechanism wherein inadvertent rotation of the hub is prevented by distribution of loads through the mounting pin thereof.

Yet another object of the invention is to provide a single, rotatable hub providing a multiple number of releasable locking functions, which hub is inertially balanced and provided with a shear pin and vibration damping spring, normally preventing inadvertent movement of the hub. Another object of the invention is to provide a release mechanism having a single moving part normally restrained from inadvertent motion in the performance of both a locking function and a subsequent unlocking function.

Other objects and many attendant advantages of the present invention will become apparent upon perusal of the following detailed description taken in conjunction with the accompanying drawings wherein:

FIG. 1 is an elevation of the release mechanism according to the invention;

FIG. 2 is an elevation of the apparatus as illustrated in FIG. 1 illustrating in exploded configurations, a releasable lap belt, a pair of releasable shoulder straps adapted for engagement upon a pivotal, sliding plunger and a portion of a canopy lanyard provided with a manually attachable insertion and locking pin;

FIG. 3 is a longitudinal section of the device shown in elevation in FIG. 1 particularly illustrating the rotatable hub according to the invention in the performance of a plurality of locking operations;

FIG. 4 is a plan view of the apparatus illustrated in FIG. 1 particularly illustrating the low profile thereof;

FIG. 5 is a bottom view of the device as illustrated in FIG. 4, which device is additionally provided with a pneumatic fitting and illustrated partially in longitudinal section to illustrate the internal structure of the device as incorporated into its low profile;

FIG. 6 is an enlarged fragmentary longitudinal section of the device of FIGS. 1 and 3 further illustrating the rotatable hub in a retained, release position;

FIG. 7 is a fragmentary enlarged detail section generally along the line 7—7 of FIG. 6; and FIG. 8 is a detail section illustrating an initial position of the structure as illustrated in FIG. 3.

With more particular to the drawings, there is illustrated in FIGS. 1 and 2 a release mechanism according to the invention generally illustrated at 10. The mechanism includes a generally U-shaped female coupling member, illustrated generally at 12, defining an access opening 14. Positively secured to the female coupling 12 is a looped belt, a portion of which is illustrated at 16. For example, the remaining portion of the belt 16 may be positively secured to a pilot's aircraft seat. The female coupling member 12 is particularly adapted for receiving in releasable mating engagement therewith a male coupling member in the form of a lug 18 having attached thereto a looped end portion of a lap belt, a portion of which is illustrated at 20. The coupling members 12 and 18 are positively retained in mating engagement as hereinafter described in detail. The U-shaped female coupling member 12 is provided with a U-shaped, removable cover plate 22. For example, the cover plate 22 is secured to the female coupling member 12 by removable pin fasteners 24 and 26.

Mechanism to positively retain the coupling members 12 and 18 in engagement includes a generally cylindrical locking pin 28 provided with a manually graspable ring 30. The locking pin 28 is manually insertable into a cylindrical bore 32, extending through the cover plate 22 and the female coupling member 12 at one corner thereof adjacent to the access opening 14. With the lug 18 engaged in the female coupling member 12 in the position as shown in FIG. 1, the manually insertable locking pin 28 is then inserted in the bore 32, as shown in FIG. 1, to engage and retain the lug 18 in positive engagement with the female coupling member 12. For example, the locking pin 28 is additionally provided with a connecting parachute lanyard, a portion of which is illustrated at 36. For example, the lanyard 36 is attached to the rip cord of a parachute. Accordingly, the locking pin 28 further acts to removably couple a pilot's parachute rip cord to the release mechanism 10. At the remaining corner of the female coupling member 12, which is adjacent to the generally U-shaped access opening 14, is located a permanently affixed mounting pin 38, a portion of which is shown protruding through the cover plate 22. Mounted for pivotal motion on the pin 38 is an elongated, generally cylindrical plunger housing 40 adapted to receive thereover looped portions of a pilot's shoulder harness, portions of which are illustrated at 42 in FIG. 2. With the looped portions 42 in registration over the cylindrical housing 40, the plunger housing 40 is manually pivoted to its position illustrated in FIG. 1. As shown in FIG. 2, a retractable plunger is shown partially protruding at 44 from the housing 40. Said protruding plunger 44 lockingly engages the lug 18, in a manner to be hereinafter described in detail whereby a pilot's shoulder harness is positively, releasably secured to the mechanism 10, the access opening 14 providing sufficient clearance between the female coupling member 12 and the plunger housing 40 to receive the looped portions 42 of said harness.

With more particular reference now being made to FIGS. 3 and 6, the particular structure of the female coupling member 12 and the lug 18, as well as the structure associated therewith, will be described more in detail. The female coupling member 12 is fabricated with a generally flat bottom wall 46 similar in U-shaped configuration to the removable cover plate 22. Along its lowermost peripheral margin 48 is provided an upstanding laterally projecting side wall 50 provided with a thickened end portion 52 which reinforces a corner of the bottom plate 46 and to provide a localized bearing structure for receiving one of the fasteners 26. In similar fashion, the side wall 86 is provided on the base plate 46. One termination 54 providing a bearing structure for receiving the other fastener 26. Spaced a relatively short distance away from the thickened portion 54 is the terminal end 56 of the side wall 50 which terminates short of the entire extended length of the bottom margin 48 of the bottom wall plate 46 to provide adequate clearance for relatively movable structure to be hereinafter described in detail, and further to conserve weight of the female coupling member 12.

The bottom plate 46 is configured with an upstanding flange portion 58 and a spaced upstanding flange portion 60, the generally U-shaped access opening 14 being defined therebetween. The bottom plate 46 additionally carries a second, laterally projecting upstanding side wall 62 of L-shaped configuration. The longer leg of the L-shaped side wall 62 extends across the U-shaped access opening 14 so as to adjoin each of the upstanding flange portions 58 and 60. Said leg portion of the side wall 62 thus lends structural reinforcement to the bases of the flanged portions 58 and 60 and further provides an enclosing side wall for housing additional structure to be hereinafter described in detail.

The shorter leg portion 64 of the L-shaped side wall 62 extends toward and terminates in spaced relationship from the thickened portion 52 of the side wall 50. As observed in FIG. 3, the belt 16 is looped about a rotatable roller 68 which is mounted for rotation within a generally U-shaped yoke 70. The yoke 70 is provided with projecting integral tab portions 72 and 74. The tab portions are secured by suitable fasteners 76 to the flange portion 58 and between the spaced side wall portions 52 and 64. Accordingly, the belt 16 is positively and permanently secured to the female coupling member 12.

With reference yet to the figures, the longer leg portion of the L-shaped side wall 62 is provided with a terminal corner portion 38 which receives one of the fasteners 24. The longer leg portion is additionally provided longitudinally centrally thereof with an elongated generally rectangular piston housing 80. The end of the piston housing 80 is provided with an end wall 82 shown affixed in desired position by pin fastener 84 removable for observation of the piston housing. A third laterally projecting upstanding side wall 86 is provided on the base plate 46. One terminal end portion 88 of the side wall 86 is of reduced thickness and abuts against the end wall 82 of the piston housing. Accordingly, the end wall 82 is retained between the portions 78 and 88 of the side walls 62 and 86, respectively. The surface of the end wall 82 facing interiorly of the housing 80 is aligned with respect to the likewise inwardly directed surface of the portion 88 of the side wall 86. Together, such surfaces provide lands against which is impinged movable structure to be hereinafter described in detail.

The side wall 86 is further characterized by a thickened side wall portion having an inclined surface 92 immediately adjacent to the reduced thickness portion 88. The surface 92 additionally acts as a land for movable structure to be described in greater detail hereinafter.

The end portion of the third side wall 86 terminates in spaced relationship from the terminal end 56 of the first side wall 50 in order to define a clearance for movable structure which will be described in detail. The end portion of the third side wall 86 receives the remaining fastener 24 for the cover plate 22.

Together the side walls 50, 62 and 86 define therebetween an internal cavity 94. A web portion 96 of the side wall 62, which portion 96 separates the cavity 94 from the piston housing 80, is of intermediate length with respect to the piston housing 80 permitting communication between the piston housing and the cavity 94. Entirely enclosed within the confines of the piston housing 80 is a slidable rectangular piston 98 provided adjacent one end thereof with a circumscribing fluid pressure seal 100. Extending generally laterally at the junction of the leg portions of the L-shaped side wall 62 is a generally cylindrical recess 102 communicating with the piston housing 80 with a connecting, reduced diameter passageway 104 generally coaxial with the elongated piston housing 80. Secured within the recess 102 is a fluid pressure elbow fitting 106, only a portion of which is illustrated in FIG. 3. With more particular reference to FIG. 5, the fitting 106 additionally extends through the cover plate 22 and is adapted for operatively connecting a source of pressurized fluid, not shown, through a connection hose 108 for a purpose to be described hereinafter.

With reference again to FIGS. 3 and 6, there is disposed within the cavity 94 an enlarged cylindrical mounting pin 108 mounted on the base plate 46 generally offset laterally to the right of center of the cavity 94 and in relative close proximity and in horizontal alignment with the end portion of the third side wall 86. As shown in FIG. 5, the mounting pin 108 is provided with a reduced diameter terminal end portion 110 fixedly secured to the base plate 46. The other terminal end portion 112 is also of reduced diameter and received within the removable cover plate 22. The central portion of the mounting pin 108 is of enlarged diameter with respect to the end portions 110 and 112 and, as shown in FIG. 5, spans the entire space between the base plate 46 and the cover plate 22. As shown in the figure, the end portions 110 and 112 of the mounting pin 108 do not protrude from either the base plate or the cover plate, thereby assuring a low profile for the release mechanism 10.

With more particular reference to FIGS. 3 and 6, the enlarged diameter central portion of the mounting pin 108 rotatably carries thereon a hub 114 provided with a central bore 116 matingly circumferentially engaging on the enlarged diameter portion of the mounting pin 108. For example, to aid in relatively friction free rotation of the hub 114 a coating, not shown, of a suitable lubricant may be provided either on the surface of the mounting pin 108 or the bore 116. As shown in FIG. 5, the hub 114 is of reduced thickness with respect to the spacing between the base plate 46 and the cover plate 22 enabling sufficient clearance for rotation on the mounting pin 108. If desired, the surfaces of hub 114 opposing the cover plate and the base plate may be provided with a lubricant coating, not shown, to insure the desired rotation.

With reference to FIGS. 3 and 6, the hub 114 is provided with an elongated, integral radially extending, generally L-shaped arm 118. The longer leg of the L-shaped arm 118 is integral with the hub 114 and partially protrudes from the cavity 94 into the piston housing 80. Such longer leg portion initially is inclined with respect to the vertical in order to provide clearance from the terminal end of the web portion 96 of the side wall 62. The shorter leg portion 120 of the L-shaped arm 118 is vertically inclined in reversed direction with respect to the longer leg portion thereof, and extends entirely with the piston housing 80. The inclined leg portion 120 is provided with a vertically inclined bearing surface 122 generally in close spaced proximity to the terminal end of the piston 98. A bevelled tip portion 124 of the shorter leg portion 120 is immediately adjacent to the inclined bearing surface 122 and further provides a protruding edge corner 126 in close spaced proximity with respect to the terminal end of the piston 98. The protruding corner portion 126 is specifically initially aligned on the longitudinal axes of the piston 98 for a purpose to be described hereinafter.

With reference to FIG. 3, mounted on the bottom plate 46 adjacent to the terminal end portion of the web 96 and entirely within the cavity 94 is a leaf spring 128. As more particularly illustrated in FIG. 7, the leaf spring 128 is secured to the bottom plate 46 with a machine screw 130 overlying a washer 132. The terminal end portion of the spring 128 is provided with a planar bearing edge surface 136 for a purpose to be described hereinafter.

As shown more particularly by reference to both FIGS. 3 and 8, said end portion of the spring 128 is provided thereon with an upstanding, generally reduced diameter shear pin 138. The longer leg portion of the radially directed arm 118 overlies the terminal end portion of the leaf spring 128. The overlying portion of the arm 118 fixedly receives the upstanding shear pin 138, the shear pin thereby acting to positively retain the arm 118 in its initial position as illustrated in FIG. 3 without danger of undesired motion thereof due to vibration or other normally encountered loads. By reference to FIG. 7, the end portion of the leaf spring 128 carrying the upstanding shear pin 138 is normally biased resiliently to assume a raised, spaced position with respect to the bottom plate 46.

By reference to FIG. 8, taken in conjunction with FIG. 3, the portion of the leg 118 which initially overlies the terminal end portion of the spring 128 initially retains the leaf spring 128 in an extended planar flat position impinging along its entire extended length against the bottom plate 46 and in opposition to the spring resilient action.

With reference to FIGS. 3 and 6, the hub 114 is provided with a second integral extended arm 140 projecting in a direction horizontally of the hub 114. A resilient, reduced diameter coil damping spring 142 is secured at the terminal end of the extended end portion of the second arm 140. The remaining end of the spring 142 is secured to a pin 144 fixedly in the bottom plate 46 in close proximity to the side wall 50. In its initial position as shown in FIG. 3, the coil spring 142 extends generally in a vertical direction. The major axis of the second arm 140 to which the spring is attached is offset from the center of the hub 114 so as to induce a counter-clockwise rotation of the hub 114. Accordingly, if due to vibrational loads or other external forces, the spring 142 is caused to extend, such extension will not induce a clockwise rotation of the hub 114 tending to shear the pin 138. Instead such extension will produce a counter-clockwise rotation. Thus the offset orientation of the arm 140 and its attached spring 142 either coact or independently operate to counteract clockwise rotation of the hub 114 which would cause pivotal motion of the arm 118 and shearing of the pin 138.

The hub 114 is provided with a third, integral extended arm 146. Such arm extends horizontally in a direction opposite to that of the second arm 140 and further extends generally radially of the lowermost vertical portion of the hub 114. Further, the third arm 146 protrudes from the cavity 94 and extends horizontally beyond the aligned terminal end portions of the side walls 50 and 86 respectively. The arm 146 is provided thereon with an integral, upstanding vertical terminal hooked end portion 148 provided thereon with a vertical planar bearing surface 150 in horizontal spaced relationship with respect to the end portion of the side wall 86. Importantly, the bearing surface 150 is oriented vertically and aligned and centered upon an axis orthogonal with respect to the vertical, which axis intersects the center of rotation of he hub 114 for a purpose to be described hereinafter. The bearing surface 150 is provided with a contiguous arcuate releasing surface 152 defining the terminal end of the leg 148.

With reference yet to FIGS. 3 and 6, the details of the male connecting member in the form of the lug 18 will be described. The lug 18 is provided with a yoke 154 which rotatably mounts thereon a roller 156 over which a looped portion of a pilot's lap belt 20 is secured. The purpose of the male connecting member 18 is to releasably couple the lap belt 20 to the release mechanism 10 according to the invention. Generally centrally of the lug 18 is a laterally extending recess defined by a segmented cylindrical compression side wall 160 contiguous with substantially diverging side walls 162 and 164. A generally cylindrical mounting pin 166 is mounted within the confines of the recess and is provided to fixedly secure an upstanding, enlarged diameter sleeve 168 to the bottom plate 46 and coaxial of the longitudinal axis of the piston housing 80. The sleeve 168 is thus partially circumscribed by the arcuate compression surface 160. In vertical alignment with the described recess, the lug 18 is provided with a downward vertically extended integral leg having a substantially relieved arcuate tapered end portion 170 and a vertical compression surface 172 contiguous with the arcuate surface 170 and adapted for impinging the vertical bearing surface 150 of the leg 148.

The uppermost vertical portion of the lug 18 is provided with a vertical upwardly directed recess defined by a first substantially vertical compression side wall 174 contiguous with a segmented cylindrical compression side wall 176. Said side wall 176 is immediately adjacent to and contiguous with a substantially vertical compression side wall 178 which is substantially in vertical alignment with the vertical compression surface 172 of the downwardly vertically extending leg of the lug 18. The side wall 178 further is contiguous with a substantially diverging arcuate side wall 180 contiguous with a reverse arcuate camming surface 182 defining an uppermost vertically extending leg of the lug 18.

Centrally of the recess described, the upstanding flange portion 60 of the base plate 46 is provided with a reduced diameter bore 184. With reference to FIGS. 3 and 4, the bore 184 is of complementary configuration to and in axial alignment with the bore 32 provided in the cover plate 22. The insertable pin 28 is adapted to be removably manually inserted and retained in the bores 32 and 184. As shown, the locking pin 28 may be of the type having an encircling sleeve 186 adapted to be partially circumscribed by the compression side wall 174, 176 and 178. It is understood that any type of locking pin may be utilized suitably for fixedly securing a canopy lanyard to the release mechanism 10 as described.

With reference again to FIGS. 3 and 6, the upward vertically extending portion of the lug 18 defined by the camming surface 182 is provided with a horizontal, laterally facing recess 188 of rectangular configuration in having an inverted horizontal bearing and compression surface 190. In vertically opposed spaced relationship with the surface 190 is a projecting flange 192 further defining the recess 188.

The pivotal cylindrical plunger housing 40 is provided therein with a longitudinal elongated recess 194 of square or rectangular configuration. The sliding plunger 44 is of complementary rectangular or square configuration and mounted for slidable motion within the recess. A longitudinal slot 196, accommodating therein a reduced diameter pin 198, is provided in the plunger housing 40 to limit slidable motion of the plunger 44 therein. Retracting sliding motion of the plunger 44 occurs against the resilient action of a reduced diameter coil spring 200 within the recess 194 and abutted against the end wall of the recess 194 and the end of the plunger 44. A protruding terminal end of the plunger 44 is defined by an inclined surface 202 adapted for camming action when impinged against the camming surface 182 of the lug.

In operation of the device, the belt 16 is normally secured to a pilot's aircraft seat forming part of the ejection apparatus which is forcibly ejected from an aircraft during an emergency. The belt 20, secured to the male connecting member 18, normally forms the well known lap belt for strapping a pilot to the aircraft seat. Accordingly, with the rotatable hub 114 and its associated arms 120, 140 and 148 retained in the initial positions shown in FIG. 3, an aircraft pilot inserts the lug 18 within the female connection member 12. More specifically, the downward vertical extending leg 170 of the lug 18 is slipped over the upward vertically projecting leg 148 of the arm 146, sufficient clearance between the leg 148 and the sleeve covered pin 166 being provided by the arcuate release surface 152 of the leg 148 and the substantially diverging side wall 164. With the compression surface 172 of the downwardly extended leg of the lug 18 in opposed position with respect to the vertical compression surface 150 of the leg 148, the lug 18 is then further positioned until the sleeve covered pin 166 is within the confines of the recess 160.

With the lug 18 thus positioned, the recess defined by the compression side walls 174, 176 and 178 will partially circumscribe the bore 184. With reference to FIG. 4, the pin 28 then may be manually inserted by the pilot into the bore 32 and 184 of the cover plate 22 and the base plate 46, whereby the lug 18 will be positively locked in mating engagement in the female connecting member 12. As shown in FIG. 4, the lug 18 is fully exposed in the vicinity of the spaced cover plates 22 and 46, thereby visually aiding the pilot in proper insertion of the locking pin 28. Such insertion of the locking pin 28 additionally fixedly secures the parachute lanyard 36 to the releasable coupling 10. In the well known manner, the lanyard 36 is secured to the rip cord of a parachute worn by the pilot.

With the lap belt 20 and the lanyard 36 thus secured, the pilot then loops the portions 42 of his shoulder harness over the cylindrical piston housing 40. The piston housing 40 is then pivoted from its position, as shown in FIG. 2, until the inclined surface 202 of the retractable piston 44 impinges against the camming surface 182. Upon further pivotal motion of the plunger housing, the plunger 44 will be retracted against the action of the resilient spring 200 by virtue of the camming action of the surface 182 upon the inclined surface 202. When the inclined surface 202 has passed the camming surface 182 the plunger 44 will once again partially protrude from the housing 40 due to the resilient action of the spring 200. A portion of the plunger 44 will thus be brought into registration partially within the recess 188, whereby the looped portions 42 of the shoulder straps are positively secured to the releasable coupling 10.

Vertical motion of the lug 18 with respect to the female connecting member 12 is positively prevented by abutment of the compression surface 176 against the sleeve 186, and abutment of the partially circumscribing arcuate compression surface 160 vertically aaginst the sleeve 168. Additionally, relative horizontal motion of the lug 18 is prevented by impingement of the compression surface 174 against the sleeve 186 and by compression of the arcuate surface 160 against the sleeve 168. Further, horizontal motion is prevented by impingement of the compression surface 178 against the sleeve 186 and by impingement of the compression surface 172 against the compression surface 150 of the leg 148. Since the compression surfaces 178 and 172 are substantially aligned, no excessive pivotal motion of the lug 18 will occur with respect to the female connecting member 12. Additionally, the compression surface 150 of the leg 148 is horizontally aligned with respect to the center of the hub 114. Accordingly, horizontal motion of the lug 18 will not tend to rotate the hub 114. Additionally the offset extending horizontal arm 140 and its associated damping spring 142 further counteracts any tendency for clockwise motion of the hub 114. Additionally, the spring is provided to dampen any motion of the hub 114 due to vibrational loads. Further, the hub 114 and its associated arms may be inertially balanced further to eliminate motion due to vibration. The location of the sleeve covered pin 166 is centrally of the belts 16 and 20 and the locking pin 28 and the lug retaining leg 148 are equal and oppositely spaced from the sleeve pin 166, whereby the tendency for relative motion between the coupling members 18 and 22 is prevented without introduction of unbalanced loads on the device 10.

To manually release the coupling members 12 and 18, a pilot merely removes the locking pin 28. The lug 18 is thus removed from the female connecting member 12 by operation in reverse to that described. When the lug 18 is removed, the plunger housing 40 will be freed for pivotal motion in order to release the shoulder harness loops 42.

However, should ejection become necessary during a flight, suitable ejection mechanism, not shown, will forcibly eject the pilot and the aircraft seat from the aircraft. Such ejection apparatus includes suitable programming mechanism, not shown, which subsequent to ejection, supplies a pulse of compressed fluid, not illustrated, through the hose 108, the fitting 106 and into the passageway 104. By the action of such pulse, the piston 98 is forcibly propelled slidably within the piston housing 80 to impinge against the corner 126 of the arm 118. The piston further continues to be propelled aaginst the arm 118 until counter-clockwise rotation of the hub 114 occurs against the action of the resilient spring 142. Such motion of the piston is insured by provision of the seal 100 preventing leakage of the air pulse pass the piston 98. Rotation of the hub 114 is assured since the corner 126 is located centrally of the longitudinal axes of the piston 98 in order to prevent introduction of forces laterally of the piston travel. Such further motion of the piston 98 causes relative sliding between the piston and the inclined surface 122 of the arm 118, such sliding action assuring against motion constricting and otherwise undesired binding forces which would delay or restrict rotation of the hub.

Acocrdingly, by sliding action of the piston 98 the hub 114 is caused to rotate clockwise. Such rotation fractures the shear pin 138. The arm 118 is thus caused to pivot from its initial position, shown in FIG. 8, overlying the end of the leaf spring 128, to a second position as illustrated in FIG. 7. With arm 118 in its second position, the leaf spring 128 is thereby released to assume its upwardly biased position in spaced relationship from the bottom plate 46. Accordingly, the end 136 of the spring 128 will engage against the arm 118 preventing its return pivotal motion and counter-clockwise rotation of the hub 114.

Clockwise rotation of the hub will continue by action of the piston 98 against the arm 118 until the portion 120 of the arm impinges against the end wall 82 and the side wall portion 88. Additionaly, the land portion 92 will be impinged by the arm 118, as shown in FIG. 6.

With more particular reference to FIG. 6, it is seen that such rotational motion pivots the arm 146 thereby releasing the end portion 90 of the lug 18 from the compression surface 150 of the leg 148. As described, the action of the leaf spring 128 prevents return motion of the arm 146. Accordingly, the released lug 18 will then tend to pivot about the locking pin 28. Such pivotal motion occurs until the substantially diverging side wall 162 clears the sleeve 168. Immediately thereafter, the substantially diverging side wall 180 will clear the sleeve 186 of the locking pin 28. Thus, the lug 18 will separate from the female connection member 12 and additionally release the plunger housing 40 for pivotal motion. Thus upon separation of the lug 18 from the coupling member 12, the lap belt 20 and the shoulder harness loops 42 are released, thereby enabling separation of the pilot from the aircraft seat. The locking pin 28 remains secured to the female coupling member 12 which, in turn, is secured to the aircraft seat by the belt 16. Accordingly, as the pilot is separated from the aircraft seat the lanyard 36 will pull the pilot's parachute rip cord.

Although, the piston 98 is propelled explosively, the coaxial location of the sleeve covered pin 166 will not transmit unbalanced forces from the female connecting member to the lug 18, due to its central location as described.

Accordingly, the present invention is specifically designed for performing a multiple number of release functions by utilizing a single rotatable moving hub. Additionally, the relative closely spaced base plate 46 and cover plate 22 provide a releasable coupling characterized by an extremely narrow profile.

Other modifications and embodiments of the present invention are contemplated without departure from the spirit of the invention. For example, the coil spring 200 may be provided with preload to prevent any expected vibrational motion of the plunger 44. Accordingly, the spirit and scope of the invention is to be limited only by the appended claims wherein:

What is claimed is:

1. A release mechanism, comprising: a base plate, a rotatable hub mounted on said base plate, an arm on said hub extending therefrom and provided with a hooked end portion, said base plate having a bore in spaced relationship from said hooked end portion, a lug received on said base plate and engaged on said hooked end portion, said lug including a recess overlying said bore of said based plated, a cover plate secured to and in spaced relationship with respect to said base plate for covering said hub and at least partially covering said lug, said cover plate having a bore aligned with said bore in said base plate, a removable pin received in said aligned bores of said base plate and said cover plate, said removable pin and said hooked end portion of said arm releasably coupling said lug on said base plate, said pin being removable to permit uncoupling of said lug from said base plate, actuating means carried by said base plate for rotating said hub and disengaging said hooked end portion from said lug, whereby said lug is uncoupled from said base plate without removal of said removable pin.

2. The structure as recited in claim 1, and further including a fixed pin mounted on said base plate an equal distance from both said hooked end portion and said bore in said base plate, said lug partially circumscribing said pin.

3. The structure as recited in claim 1 wherein said base plate further is provided with pivotal means lockingly coupled to said lug and releasable for pivotal motion only upon uncoupling of said lug from said base plate.

4. The structure of claim 1 and further including means normally restraining said hub from rotation until operation of said actuating means.

5. The structure of claim 1 and further including retaining means preventing return rotational motion of said hub subsequent to operation of said actuating means.

6. The structure of claim 1 and further including means for damping vibrational loads tending to cause rotation of said hub.

7. The structure of claim 4, wherein said restraining means is provided further for preventing return rotational motion of said hub subsequent to operation of said actuating means.

References Cited

UNITED STATES PATENTS

| | | | |
|---|---|---|---|
| 2,931,088 | 4/1960 | Trager | 24—230.1UX |
| 3,336,005 | 8/1967 | Dickerman | 24—205.17UX |
| 3,475,797 | 11/1969 | Rau | 24—230.1UX |

BERNARD A. GELAK, Primary Examiner

U.S. Cl. X.R.

24—230